United States Patent [19]

Jakobs et al.

[11] Patent Number: 5,261,324
[45] Date of Patent: Nov. 16, 1993

[54] ROLLER BEARING OF A TWO-ROLLER MACHINE

[75] Inventors: Willy Jakobs; Heinz Caspelherr, both of Cologne, Fed. Rep. of Germany

[73] Assignee: Kloeckner-Humboldt-Deutz AG, Fed. Rep. of Germany

[21] Appl. No.: 772,851

[22] Filed: Oct. 8, 1991

[30] Foreign Application Priority Data

Oct. 8, 1990 [DE] Fed. Rep. of Germany ....... 4031841
Nov. 2, 1990 [DE] Fed. Rep. of Germany ....... 4034822

[51] Int. Cl.$^5$ ................................................ B30B 3/04
[52] U.S. Cl. ................................. 100/158 R; 100/170; 72/237; 72/245; 241/232; 384/558
[58] Field of Search ............... 100/158 R, 168, 169, 100/170; 72/237, 245, 248; 384/42, 296, 558, 571; 241/232

[56] References Cited

U.S. PATENT DOCUMENTS

| | | | |
|---|---|---|---|
| 716,259 | 12/1902 | Mellors | 72/248 |
| 1,652,468 | 12/1927 | Catlin | 384/296 |
| 1,986,027 | 1/1935 | Talbot | 72/245 |
| 2,762,295 | 9/1956 | Varga et al. | 100/158 R |
| 2,797,635 | 7/1957 | Kopke | 100/170 |
| 2,832,280 | 4/1958 | Hold et al. | 100/170 |
| 3,003,374 | 10/1961 | Smith | 72/245 |
| 3,023,648 | 3/1962 | Pickles | 72/237 |
| 3,122,090 | 2/1964 | Binkowski | 100/158 R |
| 3,273,199 | 9/1966 | Kleinewefers | 100/158 R |
| 3,363,848 | 1/1968 | Neebel et al. | 384/558 |
| 3,850,485 | 11/1974 | Zimmer et al. | 384/558 |
| 3,921,514 | 11/1975 | Biondetti | 72/245 |
| 4,168,660 | 9/1979 | Zelle | 100/168 |
| 4,516,491 | 5/1985 | Winter | 100/158 R |
| 4,589,269 | 5/1986 | Michaux | 72/237 |
| 4,595,302 | 6/1986 | Attinger et al. | 384/558 |
| 4,714,359 | 12/1987 | Winter et al. | 384/558 |
| 4,727,741 | 3/1988 | Ushifusa et al. | 72/245 |
| 4,796,452 | 1/1989 | Schiel | 100/168 |
| 4,813,256 | 3/1989 | Engel | 72/245 |
| 4,926,666 | 5/1990 | Gotting et al. | 72/248 |
| 5,048,411 | 9/1991 | Siebert | 100/168 |

FOREIGN PATENT DOCUMENTS

| | | | |
|---|---|---|---|
| 906644 | 3/1954 | Fed. Rep. of Germany | 241/232 |
| 0264622 | 2/1989 | Fed. Rep. of Germany | 72/245 |
| 293685 | 12/1953 | Switzerland | 241/232 |

Primary Examiner—Harvey C. Hornsby
Assistant Examiner—Randall E. Chin
Attorney, Agent, or Firm—Hill, Steadman & Simpson

[57] ABSTRACT

A high pressure roller press for interparticle crushing and particularly a bearing support for one of the rolls having force means for the bearing housings urging the roll to obtain high pressure capable of interparticle crushing in the nip and a support bearing for one end of the roll having radial arms extending above and below the nip and guided in a slide permitting movement toward or away from the nip with a stepped bearing at one end of the roll with one bearing being a thrust bearing preventing axial movement and the other end of the roll being supported in a bearing permitting axial movement of the roll end. A rubber pad is located between each bearing and a force applying piston to allow tilting of the bearing and a frusto-conical link permits the pad to be larger than the piston.

10 Claims, 3 Drawing Sheets

ROLLER BEARING OF A TWO-ROLLER MACHINE

BACKGROUND OF THE INVENTION

The invention relates to high pressure roller presses for interparticle crushing and more particularly to an improved bearing support for one of the rolls accommodating the high forces in the nip and permitting changes in the nip width from one end of the nip to the other.

In the development of interparticle crushing as disclosed in the Schoenert U.S. Pat. No. 4,357,287, while attempts are made to obtain uniform particle draw-in along the length of the nip between two opposed rolls, unequal draw-in can occur. For the high nip forces which are necessary for interparticle crushing, it is necessary to permit relative movement between the rolls and further to permit the nip width to change from one end to the other while maintaining the very high nip pressure. Nip pressures of 500 kg per square centimeter of nip length are employed in accordance with the teaching of the foregoing Schoenert patent. To attain these high nip pressures and yet accommodate movement of the bearings, creates unique problems not encountered in ordinary roller presses.

In accordance with the structural requirements, the rollers are seated in bearings having at one end an axially fixed nonmovable bearing and at the other end an axially yieldable or resilient movable bearing. The bearings are further guided accommodating movement in the plane parallel to the roller axis. The rollers are resiliently pressed toward each other with pressing power provided by force elements.

German Published Application 28 31 249 discloses an apparatus for protecting the bearings in roller mills against overload. In that patent, one bearing housing of each roller is arranged resilient in an axial direction in the machine frame. Changes in length and the increased axial shearing forces of the bearings involved that occur due to heating during operation can be avoided in this way. Swivel joint roller bearings are provided for supporting the rollers.

A publication of the Swedish Ball Bearing Factories SKF having the title "Einsatz von Pendelrollenlagern bei Rollenpressen" is relevant for this structure. The bearings are usually designed such that the outer ring of the bearing can move in an axial direction in the bearing housing at the movable bearing side with thermal change in length or the oblique change in position of the press rolls. This, however, only occurs under pressing power. As a consequence of the actual forces thereby occurring, bearing load occurs that reduces the available useful life of the bearing up to approximately 50%.

FEATURES OF THE INVENTION

In accordance with the foregoing, an object of the present invention is to provide an improved roller bearing support for two roller machines capable of interparticle crushing which allow for free and unimpeded adjustment of the bearing housing with an oblique positioning of the movable roller and wherein difficulties heretofore present and technological limits of previous bearings can be overcome.

A further object of the invention is to provide an improved bearing structure and method of supporting roller bearing rolls wherein the life of the bearings is substantially enlarged.

A further object of the invention is to provide a unique bearing support structure and force applying means for attaining particularly high nip forces in a two roll roller press.

In accordance with a feature of the invention, at least one roller is movable and supported with a unique guiding means that provides a degree of freedom transversely or, in other words, in the plane of the axis of the rolls. The bearing is provided with a guide means which is pivotable about an axis transverse of the plane of the roll axis but can accommodate nonaxial limitation of movement at one end of the roll.

A force applying mechanism is provided utilizing a rubber pillow arrangement between the force element and the bearing housing.

The utilization of bearings which do not employ a swivel joint roller provides the advantage that with the same high load capacity, a smaller overall size can be utilized wherein the outer diameter can be made smaller and still attain a more rugged structure. This provides benefits in terms of price and provides fewer problems in the sealing of the bearing housings. Advantages are also provided over previously attainable self-aligning ball bearing arrangements which have operating parameters involved with dynamic stressing and elevated operated temperatures.

The present arrangement which employs nonoscillating bearings requires special measures to guarantee the adjustment possibility of the bearing housings such as occurs where there is oblique relative positioning of the movable roller with increase in nip width at one end relative to the other end. In the present arrangement, an articulation arrangement of the guide means is provided in combination with the elastic resilient connection between the force elements and the bearings. The present arrangement is particularly advantageous in being able to employ roller bearings of the type which use cylindrical roller bearings or tapered roller bearings or plain bearings.

Other advantages, features and objects will become more apparent with the teaching of the principles of the invention in connection with the disclosure of the preferred embodiments thereof in the specification, claims and drawings, in which:

DESCRIPTION OF THE PREFERRED EMBODIMENTS

Figure 1:
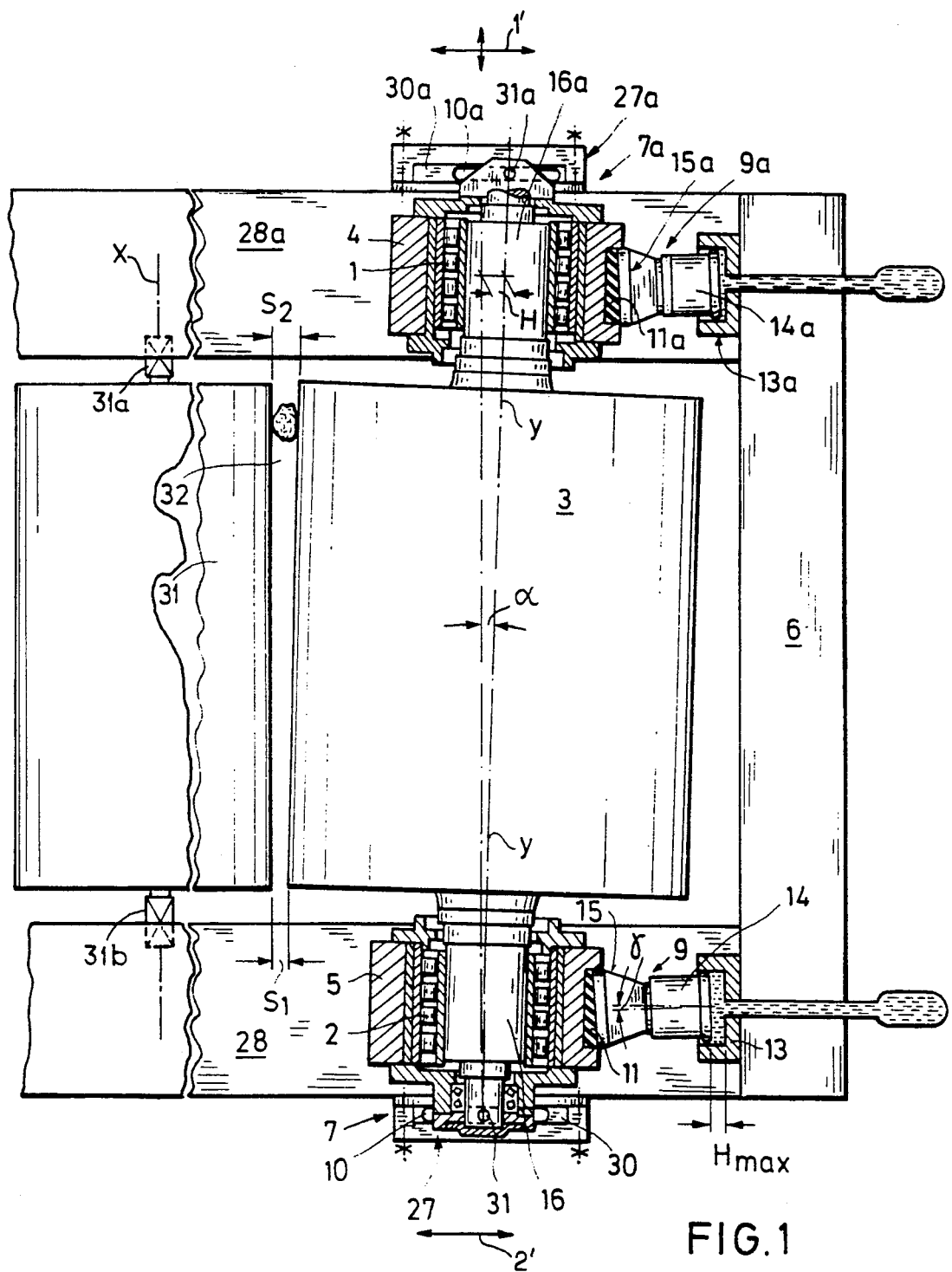
FIG. 1 is a top plan view of a two roll crusher arrangement wherein the bearings for one of the movable rolls are shown in axial section.

FIG. 1 illustrates a roller press capable of operating in accordance with interparticle crushing having a driven roller 31 rotatable on an axis X supported on fixed bearings 31a and 31b. Opposed to the first roller is a movable second roller 3 rotatable on an axis Y with the rollers defining an upwardly facing nip 32 therebetween. The roller 3 has bearing journals at the ends 16 and 16a. These journals are seated in cylindrical roller bearings 1 and 2.

The cylindrical roller bearing 2 at a first end of the roll is an axially stationary bearing, that is axially nonmovable with respect to a machine frame 6. The cooperating bearing 1 at the second opposite end is an axially movable bearing. Direction of movement of the bearings is shown by the arrowed lines 2' and 1' in FIG. 1.

The bearings are supported in bearing housings 4 and 5 which are guided in the machine frame 6 in a horizontal guide surface 28 and 28a. This provides a degree of freedom toward or away from the nip or, in other words, in the horizontal plane passing through the axis of the rolls. The nip pressure is afforded by forcing each of the bearing housings 4 and 5 of the roller 3 with force elements 9 and 9a.

The view of FIG. 1 illustrates what will occur during typical operation when more material is drawn in at one end of the nip than the other so as to cause a skewing or oblique positioning of the movable roll 3 relative to the roll 31. The higher nip contents at one end of the nip 32 provide an excursion angle $\alpha$ for the movable roll and consequent excursion of the movable bearing 1 by a distance H. A wedge-shaped crushing nip 32 having different nip dimensions $S_1$ at the smaller end and $S_2$ at the larger end thereby occurs.

In contrast to swivel joint roller bearings, the cylindrical roller bearings 1 and 2 cannot follow this oblique position with skewing of the movable roller 3. Construction is provided to accommodate this while retaining the high forces in the nip and using roller bearings which can tolerate the extremely high loads of interparticle crushing.

The bearing 2 of the movable roller 3 is guided to permit horizontal freedom transversely of the nip. Since the roller mill will normally operate with the nip facing vertically for a gravitational feed of the material, reference may be made to the nip facing vertically and the movable roller moving in the horizontal plane which is the plane of the axes of the rollers.

The bearing housing 5 is movable in the horizontal plane guided in nonaxial movement in a slideway 7 on the machine frame 6 guided by guide means 10. The guide means 10 is pivotably connected to the bearing housing 5 with a pivotal support 31 which accommodates pivotal movement about a vertical axis or, in other words, an axis transverse to the plane of the roller axes. The bearing housing 5, however cannot shift in an axial direction.

Figure 2:
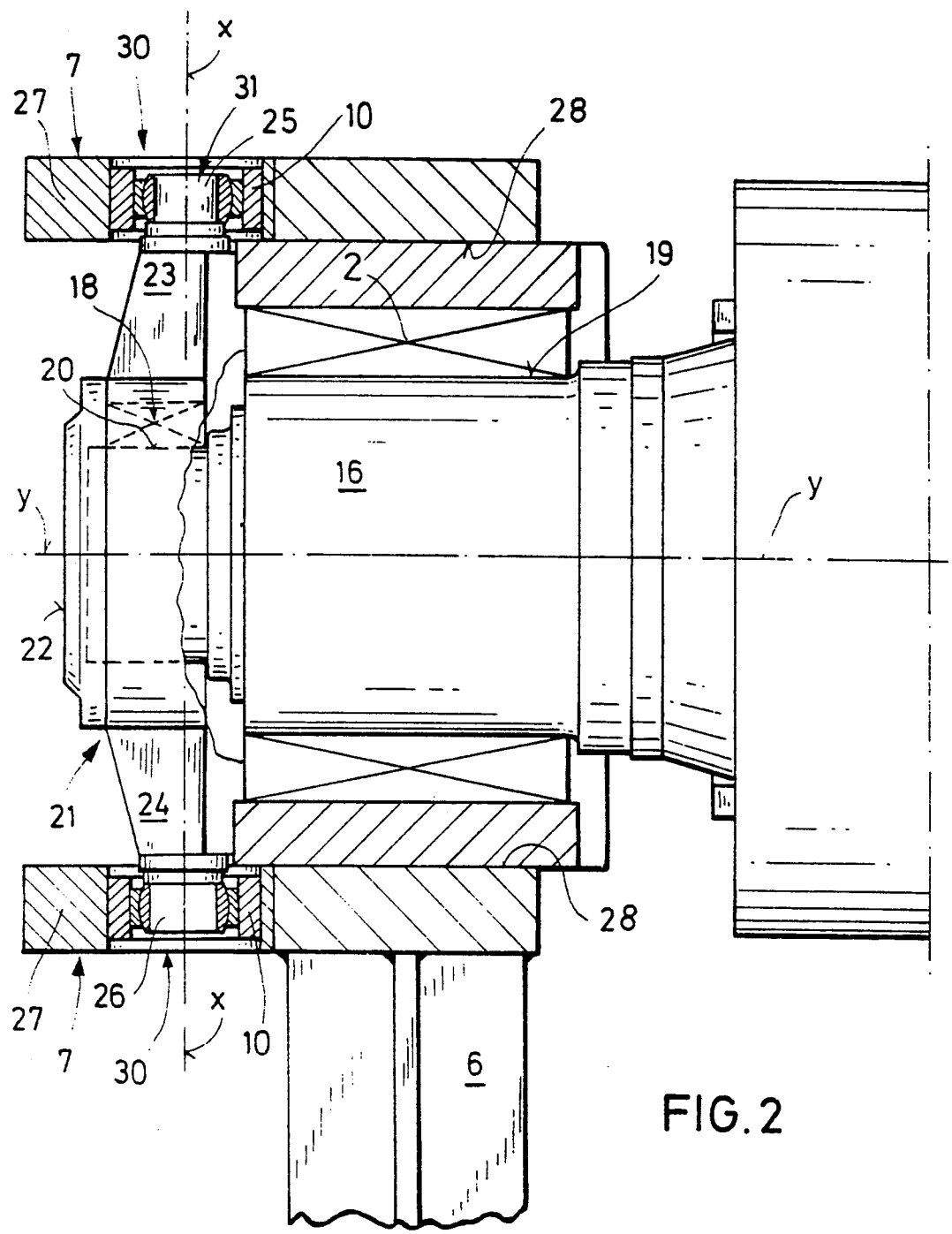
FIG. 2 is a sectional view somewhat enlarged over FIG. 1 taken substantially along line II—II of FIG. 1.

In accordance with the design of the overall bearings, utilizing cylindrical roller bearings, the bearing journal 16 at the first end of the roll is constructed for a cylindrical main bearing 2 and an outer guide bearing 18 (FIGS. 1 and 2). The journal is provided with offset portions for offset bearing seats 19 and 20. The guide bearing 18 is a thrust bearing having a separate bearing housing 21 and functioning to prevent axial movement of the roll and journal at this first end.

The bearing housing cover 22 has radially extending arms 23 and 24 with the ends providing pivotal or rotary supports and movable in a slideway 7 which extends parallel to the plane of the roll axes or essentially horizontally where the nip faces vertically. The slideway 7 on both ends is located outside the bearing housing 21 and outside the machine frame 6 and is thus accessible and easily adjustable at any time.

As can be seen in FIGS. 1 and 2, the housings 4 and 5 of the bearings have a degree of freedom accommodating transverse movement toward or away from the nip in the plane of the roller axes. These are guided between upper and lower guide surfaces 28 at the first end and 28a at the second end.

In the exemplary embodiment of FIG. 1, the force elements 9 and 9a are piston and cylinder units. These have pistons 14 and 14a arranged in flat cylinders 13 and 13a. In cooperation with these particular bearing structures, these are provided with a uniform seating arrangement by the provision of rubber pillows 11 and 11a. To accommodate full bearing housing support and relative tilting or nonaxial movement caused by tilting of the axis of the roll, the pillows are of enlarged diameter and the piston rods are frusto-conical in shape as shown by the piston rods 15 and 15a. The frusto-conical arrangement is such that the larger end faces the rubber pillows and the smaller end faces the pistons.

The slideways 7 and 7a have guide members 27 and 27a arranged next to the guide surfaces 28 and 28a at the machine frame. These guide members 27 and 27a have guide slots 30 and 30a which extend parallel to the guide surfaces 28 and 28a and which extend 90° to the axis X of the fixed roll 31.

Figure 2A:
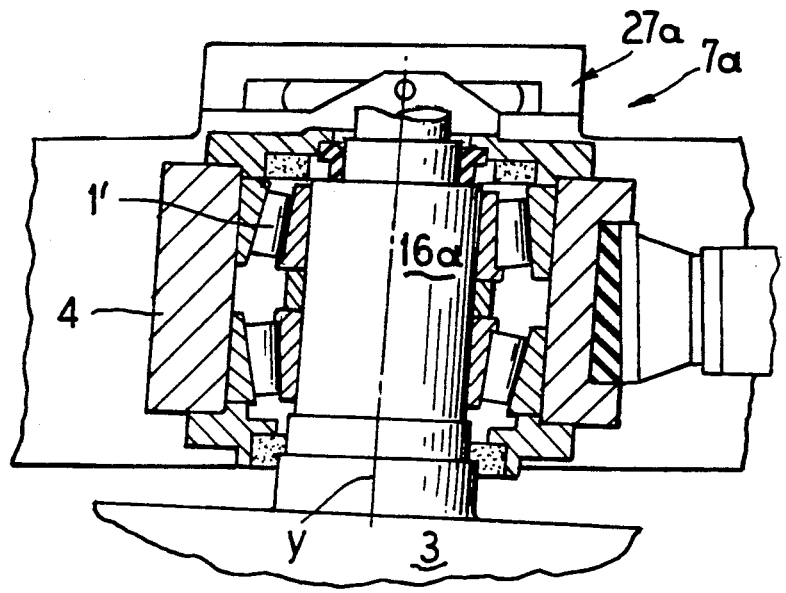
FIGS. 2A and 2B show alternate forms of bearings and are fragmentary sectional views.
Figure 2B:
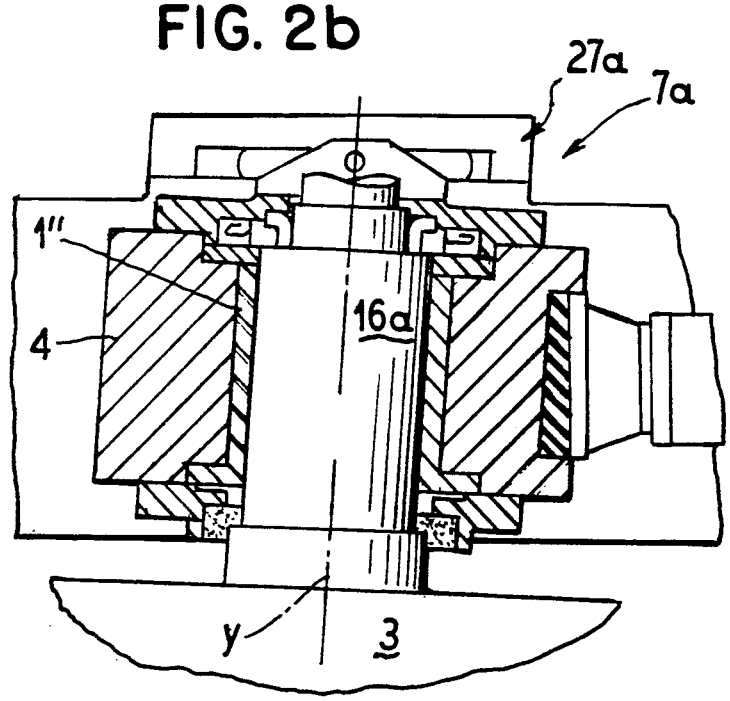

An arrangement which provides that the bearing housing 5 of the stationary bearing 2 as well as the bearing housing 4 of the movable bearing 1 are guided in slideways 7 and 7a via guide means 10 such that they are pivotally articulated to the machine frame 6. In this arrangement, the axially movable bearing 1 accommodates the skewing of the roller 3 by relative axial displacement of the bearing housing 4. Plain bearings can also be utilized particularly in combination with an hydraulic supply system. In some instances, it may be desirable to employ instead of plain roller bearings, tapered bearings or plain bearings as shown in FIGS. 2a and 2b. The bearings are each of the type, as shown, which remain coaxial with the roller axis. The bearings at each end will have a bearing housing which will be coaxial with the roller axis and each housing will have a slideway that permits the housing to be pivotal about an axis transverse of the plane defined by the axes of the two rollers. One bearing will be axially nonmovable holding the roller nonmovable axially and the other bearing will be axially slidable on the roller. The slideway is at the outer end of each bearing to be accessible from outside of the frame. In FIGS. 2a and 2b, parts which correspond to the illustrations of FIGS. 1 and 2 are similarly numbered. In FIG. 2a, the parts are given similar numbers with the addition of a '. In FIG. 2b, the parts are given similar numbers with the addition of a ".

In operation as the roller press operates, material is drawn into the nip and excessive material at one side can cause the first roller to tilt by an angle $\alpha$ as illustrated by the axis line y in tilted and untilted positions. The change in nip width at each end of the roll 3 is accommodated by the horizontal slides 10 and 10a sliding in the slots 30. The stepped bearing arrangement including the thrust bearing on the first end of the roll holds the journal 16 nonaxially while the journal at the opposite end is free to move axially. Thus, uniform pressures at the nips at the high interparticle pressure can be maintained.

Thus, it will be seen there has been provided a roller press capable of interparticle crushing which avoids disadvantages of the prior art and provides for longer bearing life.

We claim as our invention:

1. In a press having opposed rollers defining a pressing nip therebetween including at least one movable roller for applying a pressing force in the nip between the rollers, a bearing support for the movable roller comprising in combination:

first and second high load bearings for a first end and a second end of the movable roller each having a bearing housing;

the first bearing having an axially fixed position on the roller;

the second bearing housing being axially movable on the roller;

each of said bearings and bearing housings being coaxial with the roller axis; and slideways for each of the bearing housings each permitting movement of the bearing housings in a horizontal plane passing through the axes of the opposed rollers each permitting the bearing housings to be pivotable about an axis transverse of said plane and being nonmovable in an axial direction relative to the roller;

each of the slideways being axially outwardly of the bearing housings to be accessible and adjustable from outside of a frame of the press.

2. In a press having opposed rollers defining a pressing nip therebetween including at least one movable roller for applying a pressing force in the nip between the rollers, a bearing support for the movable roller constructed in accordance with claim 1:

wherein each of the bearings are cylindrical roller bearings.

3. In a press having opposed rollers defining a pressing nip therebetween including at least one movable roller for applying a pressing force in the nip between the rollers, a bearing support for the movable roller constructed in accordance with claim 1:

wherein each of the bearings are tapered roller bearings.

4. In a press having opposed rollers defining a pressing nip therebetween including at least one movable roller for applying a pressing force in the nip between the rollers, a bearing support for the movable roller constructed in accordance with claim 1:

wherein each of the bearings are plain bearings.

5. In a press having opposed rollers defining a pressing nip therebetween including at least one movable roller for applying a pressing force in the nip between the rollers, a bearing support for the movable roller constructed in accordance with claim 1:

wherein resilient elastic pressure elements are arranged for applying a force on the bearing housings toward the nip between the rollers.

6. In a press having opposed rollers defining a pressing nip therebetween including at least one movable roller for applying a pressing force in the nip between the rollers, a bearing support for the movable roller constructed in accordance with claim 1:

wherein the bearing housing for the first end includes an axial thrust bearing.

7. In a press having opposed rollers defining a pressing nip therebetween including at least one movable roller for applying a pressing force in the nip between the rollers, a bearing support for the movable roller constructed in accordance with claim 1:

wherein the bearing housings are urged with a predetermined pressure toward the roller nip by cylinders with piston rods therein connected to piston extensions frusto-conically shaped with an enlarged end extending toward said bearing housings.

8. In a press having opposed rollers defining a pressing nip therebetween including at least one movable roller for applying a pressing force in the nip between the rollers, a bearing support for the movable roller constructed in accordance with claim 1:

wherein each of the slideways has a radial arm extending transversely of said plane with the arm slidable in a guide slot extending in the direction of said plane.

9. In a press having opposed rollers defining a pressing nip therebetween including at least one movable roller for applying a pressing force in the nip between the rollers, a bearing support for the movable roller constructed in accordance with claim 8:

wherein said arms are pivotable about an axis transverse of said plane.

10. A roller press for comminuting material in an interparticle crushing high pressure pressing operation comprising in combination:

first and second opposed rollers defining a vertical facing nip therebetween;

bearing means supporting the first roller on a fixed axis;

bearing means supporting the second roller and accommodating movement of the roller toward or away from the nip including bearing housings at each end of the roller, the bearing housings being coaxial with the second roller axis;

force means at each end of the second roller applying a horizontal force toward the nip on the bearing housings including a pressure cylinder for each of the force means with a piston therein connected to a frusto-conical force transmitting link with the large end toward the bearing housing;

a resilient rubber pad between the force link and the bearing housing accommodating tilting movement of the bearing housing relative to the force means;

a bearing within the housing at a first end of the second roller having a first rotary support bearing and a second thrust bearing preventing axial movement of the roller;

a slideway for each end of the second roller axially outwardly of the bearing having vertical radial arms extending transverse of a horizontal plane passing through the axes of the rollers supporting the housing for each bearing;

a slide receiving the radial arms at each side of the bearing and accommodating movement of the bearing housings toward or away from the nip;

a rotary bearing within the housing for a second end of the second roller accommodating axial movement of the roller with changes of the nip width along the rollers;

and a pivotal bearing between the radial arms and the slide.

* * * * *